(12) United States Patent
Kambayashi

(10) Patent No.: US 6,519,139 B2
(45) Date of Patent: Feb. 11, 2003

(54) KEYBOARD AND ELECTRONIC APPARATUS

(75) Inventor: Ko Kambayashi, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/828,826

(22) Filed: Apr. 10, 2001

(65) Prior Publication Data

US 2001/0021098 A1 Sep. 13, 2001

Related U.S. Application Data

(63) Continuation of application No. PCT/JP99/00958, filed on Feb. 26, 1999.

(30) Foreign Application Priority Data

Oct. 20, 1998 (JP) .............................. 10-298137

(51) Int. Cl.⁷ .............................. G06F 1/16; H05F 1/20
(52) U.S. Cl. .................... 361/683; 361/680; 312/223.1; 400/415; 248/118.3; 248/918
(58) Field of Search ................................ 361/680, 683, 361/686; 312/223.1, 223.2; 248/118, 118.1, 118.3, 918, 631; 400/415, 691, 693

(56) References Cited

U.S. PATENT DOCUMENTS

| | | | | |
|---|---|---|---|---|
| 5,682,290 A | * | 10/1997 | Markow et al. | 361/683 |
| 5,717,430 A | * | 2/1998 | Copland et al. | 345/168 |
| 5,717,431 A | * | 2/1998 | Chai-Ying et al. | 345/168 |
| 5,847,922 A | * | 12/1998 | Smith et al. | 361/685 |
| 5,880,685 A | * | 3/1999 | Weeks | 345/168 |
| 5,978,215 A | * | 11/1999 | Chiu et al. | 400/714 |
| 6,067,224 A | * | 5/2000 | Nobuchi | 361/683 |
| 6,359,994 B1 | * | 3/2002 | Markow et al. | 361/683 |

FOREIGN PATENT DOCUMENTS

| | | |
|---|---|---|
| JP | 3019664 | 10/1995 |
| JP | 8-76885 | 3/1996 |
| JP | 9-81271 | 3/1997 |
| JP | 9-120354 | 5/1997 |
| JP | 10-124183 | 5/1998 |
| JP | 11-53056 | 2/1999 |

* cited by examiner

Primary Examiner—Darren Schuberg
Assistant Examiner—Lisa Lea-Edmonds
(74) Attorney, Agent, or Firm—Staas & Halsey LLP

(57) ABSTRACT

A keyboard includes a plurality of keys, a palm rest portion and speakers. The speakers are encompassed by elastic members and are held by the elastic members in a region below the palm rest portion. The elastic members are cylindrical members mounted to the lower cover of the case, and the speakers are inserted into the elastic members in an upwardly facing position and emit sound upwards towards the output portions of the upper cover of the case. The upper cover deflects, when a user's hand is placed thereon, to be pressed onto the speaker to improve the output of the speaker.

18 Claims, 4 Drawing Sheets

KEYBOARD AND ELECTRONIC APPARATUS

CROSS-REFERENCE TO RELATED APPLICATIONS

This application is based upon and claims priority of Japanese Patent Application No. 10-298137, filed Oct. 20, 1998, the contents being incorporated therein by reference, and a continuation of PCT/JP99/00958 filed Feb. 26, 1999.

1. Technical Field

The present invention relates to a keyboard and an electronic apparatus.

2. Background Art

Information processing apparatuses such as personal computers now have built-in speakers and can output sound. Japanese Unexamined Patent Publication (Kokai) No. 8-76885, for example, discloses a speaker fitting structure of an information processing apparatus in which a speaker is fitted to a keyboard. In this prior art technology, a track ball is disposed along a keyboard and a speaker is held by a processing substrate of the track ball by a speaker-holding member inclusive of screws. Japanese Unexamined Patent Publication (Kokai) No. 9-81271 discloses a portable electronic apparatus in which a speaker is fitted to a keyboard. In this prior art technology, the speaker is disposed in a region above an arrangement region of the keys and is removably fitted from above using speaker-fitting screws.

When a speaker is arranged in an information processing apparatus or in a keyboard, the speaker is generally disposed inside a case at a position where the case is relatively less flexible. Alternatively, the structure of the region in which the speaker is held is reinforced in many cases so that the speaker is less affected by the flexure of the case.

As the thickness and the size of the information processing apparatus or the keyboard have been reduced, however, the position at which the speaker can be disposed has become strictly limited. It has become also difficult to arrange the speaker at a position of the case free from flexure, or to reinforce the structure of the region where the speaker is arranged. Reduction of the thickness and the size of the speaker itself, to be assembled into the information processing apparatus or in the keyboard, has been required with the result that the speaker output is restricted.

SUMMARY OF THE INVENTION

It is an object of the present invention to provide a keyboard allowing a speaker to be arranged at a position of a case at which flexure may occur and capable of improving a speaker output, and an electronic apparatus.

A keyboard according to the present invention comprises a plurality of keys, a case including a palm rest portion, and a speaker encompassed by an elastic member and held by the elastic member in a region below the palm rest portion.

In this construction, the elastic member encompasses and fits the speaker to the case, and therefore, even when the case is likely to undergo flexure, the speaker is held without being affected by flexure of the case. The palm rest portion of the keyboard is the portion where a user places the palm when touching the keys, and is likely to downwardly flex due to the weight of the hand. When the palm rest portion downwardly flexes, the palm rest portion presses the elastic member encompassing the speaker and the speaker reaches the state where it is strongly fixed to the case, thereby reducing the gap between the palm rest portion and the speaker. As a result, the palm rest portion serves as a separating plate that separates the front portion and the rear portion of the speaker from each other, and directivity and output of the speaker can be improved. In consequence, the thickness and size of both keyboard and speaker can be reduced.

Preferably, the elastic member includes an annular portion encompassing an outer peripheral portion of the speaker, a bottom portion at least partially covering the bottom portion of the speaker and an upper portion at least partially covering a peripheral portion of an upper portion of the speaker.

Preferably, the bottom portion of the elastic member has an engagement portion to be anchored to the keyboard.

Preferably, the keyboard has a groove for receiving the engagement portion.

Preferably, the elastic member is made of a rubber.

Preferably, the keyboard includes a lower cover, an electronic component mounted to the lower cover and an upper cover at least partially covering the lower cover, wherein the speaker is mounted to the lower cover in such a fashion as to emit sound towards the upper cover, and the upper cover has holes above the speakers for emitting upwards the sound.

Preferably, at least the palm rest portion of the upper cover is made of a flexible material, and the palm rest portion flexes due to the weight of a user's hand when the user places the palm thereon, reducing thereby the gap between the palm rest portion of the upper cover and the speaker to improve the directivity of the speakers.

The present invention provides also an electronic apparatus having the features described above. In other words, the electronic apparatus according to the present invention comprises a case having a palm rest portion, and a speaker encompassed by an elastic member and held by the elastic member in a region below the palm rest portion.

Preferably, the electronic apparatus comprises a portable type information processing apparatus.

BRIEF DESCRIPTION OF DRAWINGS

The preferred embodiments of the present invention will now be described in greater detail with reference to the drawings, in which.

BEST MODE FOR CARRYING OUT THE INVENTION

Figure 1:
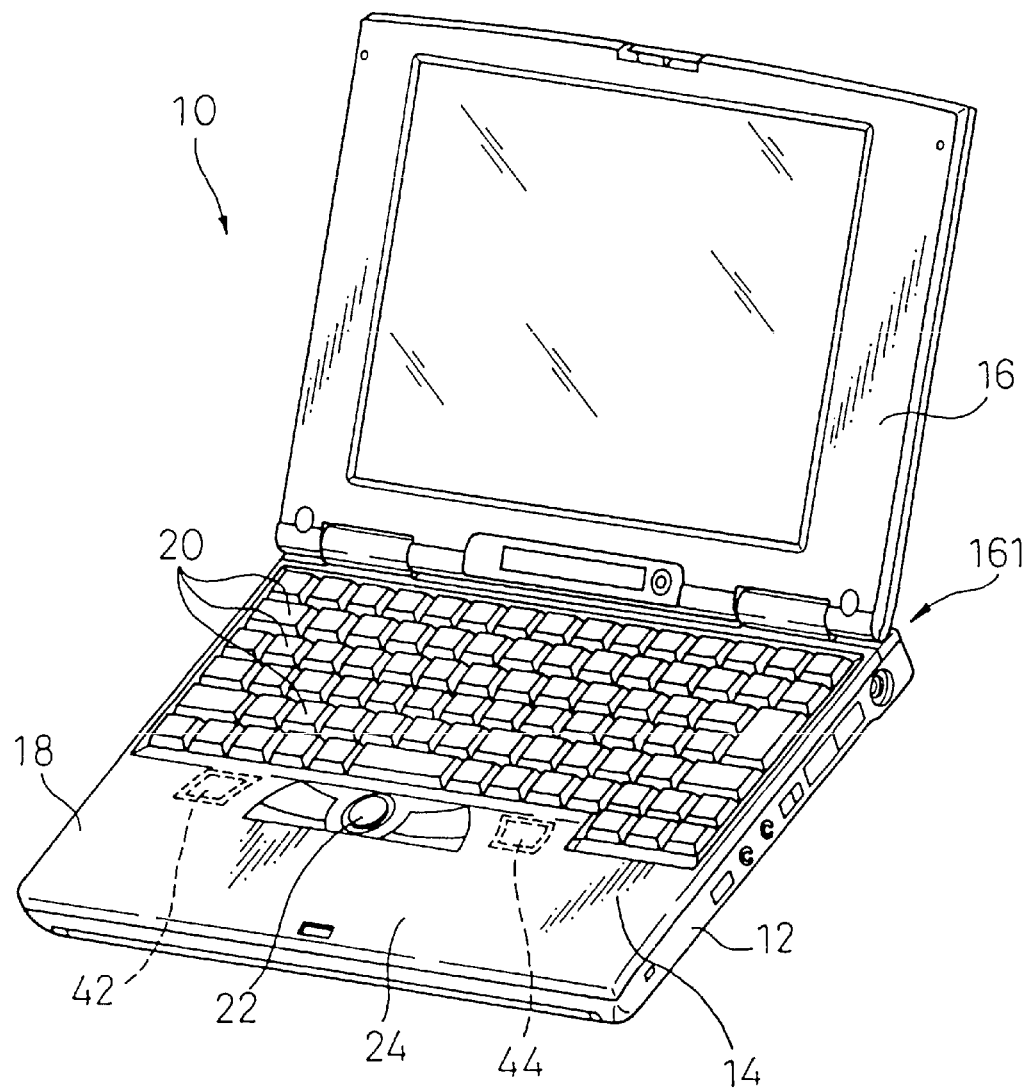
FIG. 1 is a perspective view showing an information processing apparatus according to the embodiment of the present invention.

FIG. 1 is a perspective view showing an electronic apparatus according to the embodiment of the present invention. The drawing shows a portable notebook type personal computer (personal computer) which is an information processing apparatus 10, as an example of the electronic apparatus. However, the electronic apparatus according to the present invention is not limited to the information processing apparatus, but can be applied to other types of electronic apparatuses. Also, this embodiment deals with the information processing apparatus, but the information processing apparatus includes not only so-called "computers" but also those apparatuses which execute any information processing, acquire data, and execute programs, etc, such as electronic notebooks, personal digital assistants (PDAs), portable terminals, and so forth.

The information processing apparatus 10 has a body portion 12. The body portion 12 incorporates therein an information processing means (not shown) containing a microprocessor, a system memory (not shown), a hard disk drive 30 (see FIG. 2), and so forth. The body portion 12 is coupled with a display 16 through a hinge 161. The information processing apparatus of FIG. 1 is a portable type information apparatus of the kind called a "notebook type personal computer" or a "lap-top personal computer", as shown. A keyboard portion 14 is disposed on the upper surface of the body portion 12. Electronic devices necessary for processing information such as an information processing means (not shown) containing a microprocessor, a system memory (not shown), and a hard disk, etc., are arranged in the body portion 12, and the body portion 12 functions also as a keyboard portion 14. The keyboard portion 14 includes a case 18 and a plurality of keys 20 arranged on the case 18. The keys 20 of the keyboard portion 14 are electrically connected to the microprocessor. A pointing device 22 is disposed in the keyboard portion 14 adjacent to the keys 20. Further, the keyboard portion 14 has a palm rest portion 24 in front of the keys 20. The palm rest portion 24 is the portion on which a user often puts the palm while touching the keys 20 of the keyboard 14.

The pointing device 22 may include a track ball, a pointing stick (called also a "joystick", a "quick point" or a "track point"), a touch pad, and so forth. In the case of a portable information processing apparatus such as a notebook type personal computer, the display portion 16 is called also an "upper portion" and the rest of the body portion 12, a "lower portion".

Figure 2:
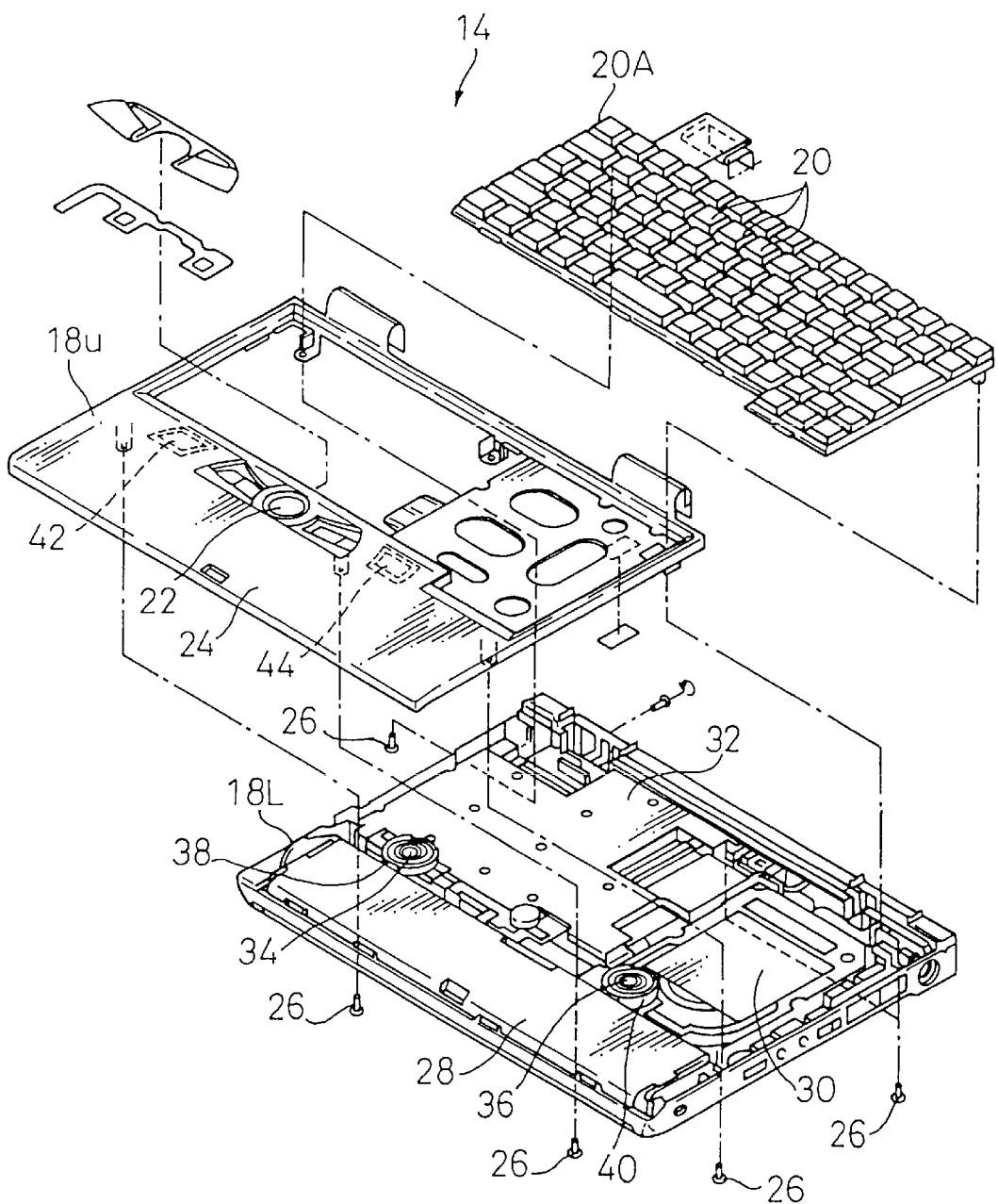
FIG. 2 is an exploded perspective view of the keyboard shown in FIG. 1.

FIG. 2 is an exploded perspective view showing the keyboard portion 14. The case 18 comprises an upper cover 18U and a lower cover 18L, and a plurality of keys 20 are constituted by a key unit 20A. The upper cover 18U and the lower cover 18L are articles molded of a resin. The upper cover 18U, the lower cover 18L and the key unit 20A are integrated with one another by screws 26.

Almost all the components of the keyboard portion 14 except for the keys are attached to the lower cover 18L. For example, in FIG. 2, a battery 28, a hard disk drive 30 and a heat radiation plate 32. A printed circuit board is disposed below the heat radiation plate 32. On the other hand, components other than the pointing device 22 are not fitted to the upper cover 18U, and the palm rest portion 24 is formed as a substantially thin, flat and plate-like portion of the upper cover 18U, and easily undergoes deflection when it is pressed.

Speakers 34 and 36 are mounted to the lower cover 18L by elastic members 38 and 40, respectively. The upper cover 18U has output portions 42 and 44 having a plurality of small holes for emitting the sound from the speakers 34 and 36. These output portions 42 and 44 are disposed in the palm rest portion 24 of the upper cover 18U. In this embodiment, the output portions 42 and 44 are arranged on either side of the pointing device 22. The speakers 34 and 36 are mounted to the lower cover 18L in such a fashion as to emit the sound towards the upper cover 18U, that is, towards the output portions 42 and 44.

The speakers 34 and 36 are encompassed and held by the elastic members 38 and 40 in the region of the case 18 below the palm rest portion 24, respectively. Hereinafter, the speakers will be explained in detail.

Figure 3:
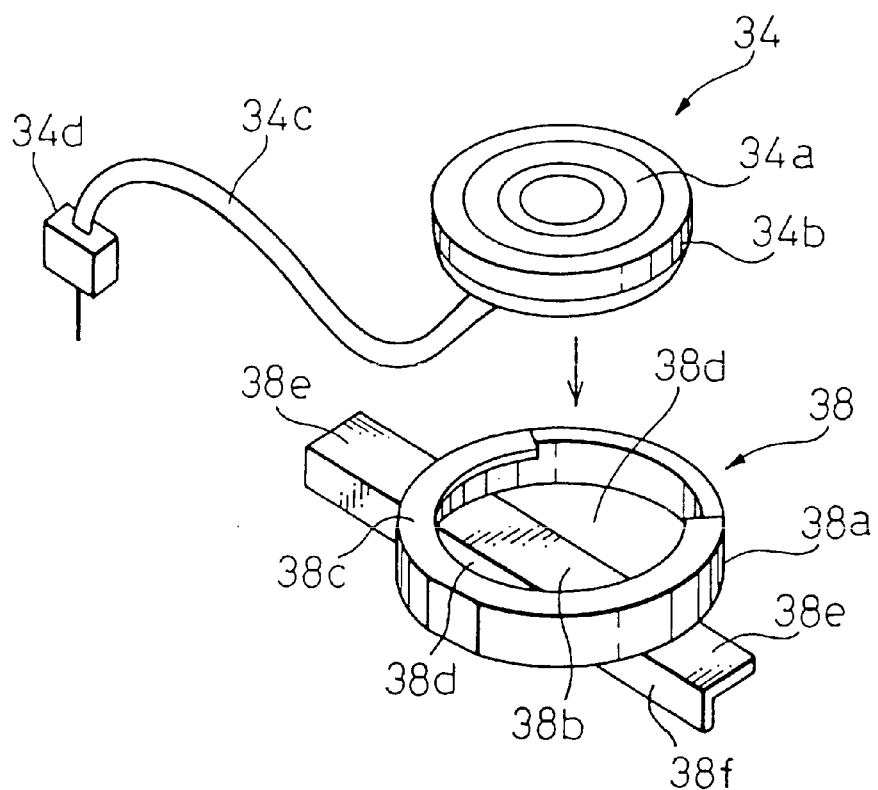
FIG. 3 is a perspective view of the speaker and the elastic member shown in FIGS. 1 and 2.

FIG. 3 is a perspective view showing the speaker 34 and the elastic member 38 on the left side in FIG. 2. The speaker 34 includes a vibration plate 34a connected to a voice coil (not shown), a frame 34b coupled to the peripheral portion of the vibration plate 34a and other components such as a permanent magnet. A lead wire 34c extends from the voice coil. A connector 34d provided to the distal end of the lead wire 34c is fitted in a connector provided in the lower cover 18L.

The elastic member 38 is basically made of rubber and has a cylindrical shape. The elastic member 38 includes a ring-like portion 38a encompassing the outer peripheral portion of the speaker 34, a bottom portion 38b at least partially covering the bottom portion of the speaker 34, and an upper portion 38c at least partially covering the peripheral portion of the upper portion of the speaker 34. The speaker 34 is inserted into the elastic member 38, as shown by an arrow.

The upper portion 38c is formed as a flange shape that protrudes radially inward from the upper edge of the ring-like portion 38a, and covers the peripheral portion of the upper end of the frame 34b of the speaker 34 when the speaker 34 is fitted into the elastic member 38. To facilitate insertion of the speaker 34, the upper portion 38c has a partially circular shape formed by cutting off a part of a circle. The bottom portion 38b is shaped as a straight strip form extending with a width smaller than the diameter of the ring-like portion 38a, and therefore, spaces 38d are formed at the bottom of the elastic member 38. The lead wire 34c can be taken out through the spaces 38d.

The bottom portion 38b has an extension portion 38e extending outside the ring-like portion 38a. The bottom portion 38b and the extension portion 38e include an engagement portion 38f extending vertically downward.

Figure 4:
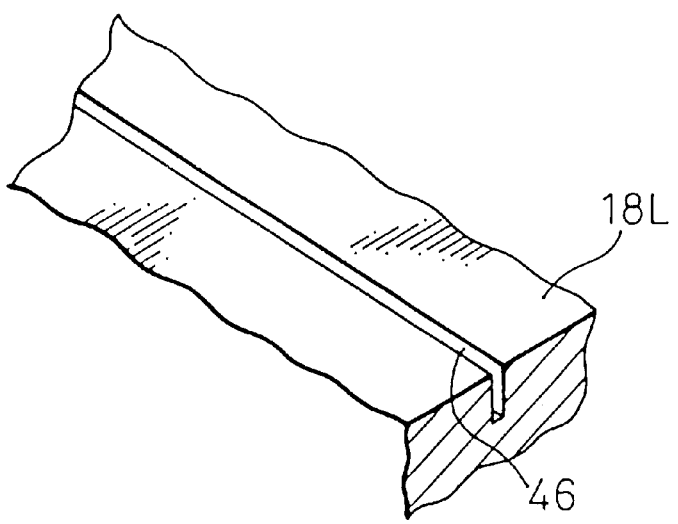
FIG. 4 is a perspective view showing the groove that engages with the engagement tongue of the elastic member shown in FIG. 3.

FIG. 4 shows a groove 46 formed in the lower cover 18L (or in a member fitted to the lower cover 18L). The speaker 34 can be held by the elastic member 38 in the lower cover 18L, by pushing the engagement portion 38f into the groove 46, while the speaker 34 is substantially encompassed by the elastic member 38 after the speaker 34 is inserted in the elastic member 38.

Figure 5:
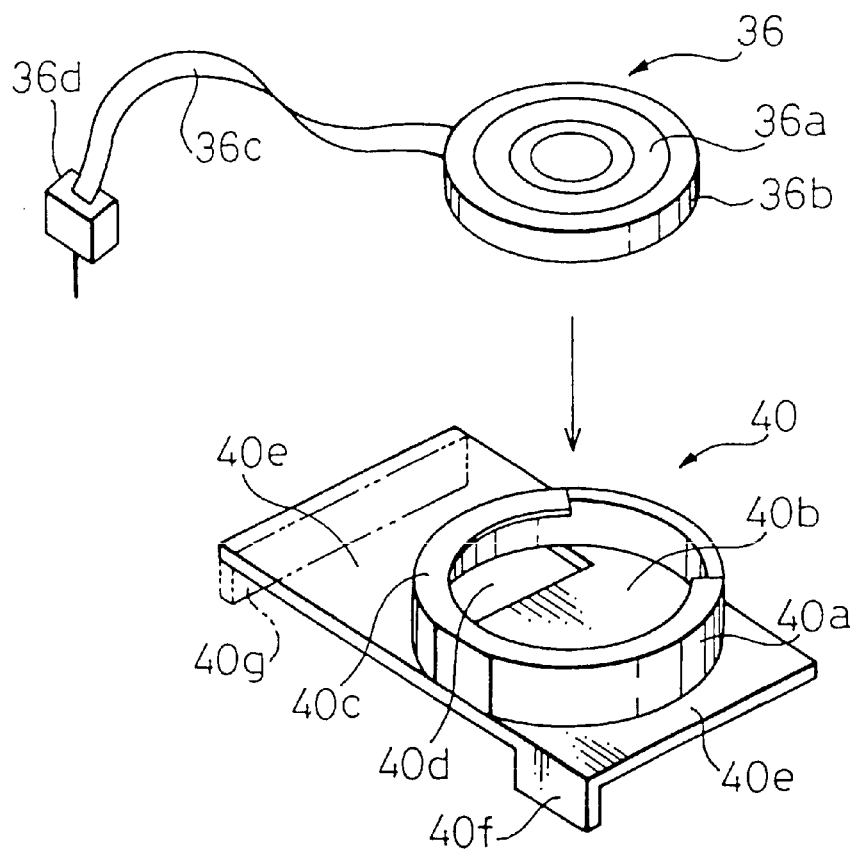
FIG. 5 is a perspective view of another speaker and another elastic member shown in FIGS. 1 and 2.

FIG. 5 is a perspective view showing the speaker 36 and the elastic member 40 on the right side in FIG. 2. The speaker 36 includes a vibration plate 36a, a frame 36b, a lead wire 36c and a connector 36d in the same way as the speaker 36 described above.

The elastic member 40 is basically made of a rubber having a cylindrical shape in the same way as the elastic member 38. The elastic member 40 includes a ring-like portion 40a encompassing the outer peripheral portion of the speaker 36, a bottom portion 40b at least partially covering the bottom portion of the speaker 36, and an upper portion 40c at least partially covering the peripheral portion of the upper portion of the speaker 36. The speaker 36 is inserted into the elastic member 40, as shown by the arrow.

The upper portion 40c is shaped as a flange form protruding radially inward from the upper end of the ring-like portion 40a, and covers the peripheral portion of the upper end of the frame 36b of the speaker 36 when the speaker 36 is inserted into the elastic member 40. To facilitate insertion of the speaker 36, the upper portion 40c has a partially circular shape formed by cutting off a part of a circle. The bottom portion 40b is shaped as a straight strip form extending with a width substantially equal to the diameter of the ring-like portion 40a. A space 40d is formed in the bottom portion 40b. The lead wire 36c can be taken out through this space 40d.

The bottom portion 40b has an extension portion 40e extending outside the ring-like portion 40a. A part of the extension portion 38e has an engagement portion 40f extending vertically downward.

Figure 6:
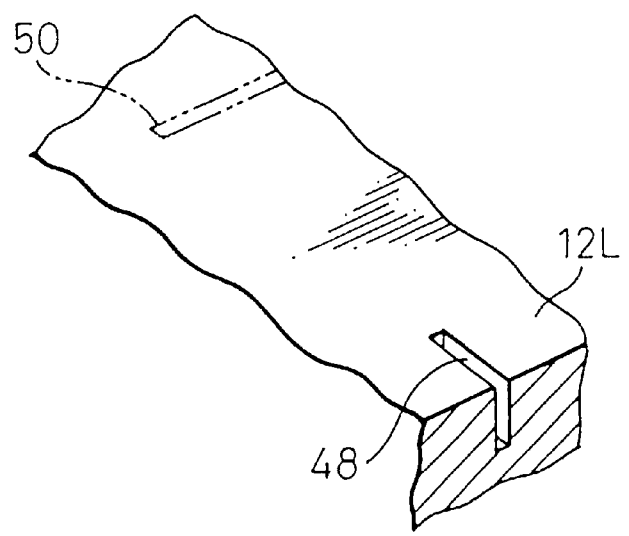
FIG. 6 is a perspective view showing the groove that engages with the engagement tongue of the elastic member shown in FIG. 3.

FIG. 6 shows a groove 48 formed in the lower cover 18L (or in a member fitted to the lower cover 18L). The speaker 36 can be held in the lower cover 18L by the elastic member 40, by pushing the engagement portion 40f into the groove 48, while the elastic member 40 substantially encompasses the speaker 36 after the speaker 36 is inserted into the elastic member 40. Incidentally, because the engagement portion 40f is short, the holding force may be insufficient, and in such a case, an engagement portion 40g extending in the vertical direction relative to the engagement portion 40f on the opposite side is formed, and a groove 50 for fitting the engagement portion 18L is formed in the lower cover 18L. Since this embodiment uses the elastic members 38 and 40 made of the rubber, it can use the engagement portions 38f, 40f and 40g the positions and the sizes of which can be changed in accordance with the space of the lower cove 18L.

In the construction described above, speakers 34 and 36 are encompassed by the elastic members 38 and 40 and held by the elastic members 38 and 40 to the case 18, and therefore, even when the case 18 is flexible, the speakers 34 and 36 can be held without being affected by the flexure of the case 18. The palm rest 24 is the portion on which the user often places the palm while touching the keys 20 of the keyboard 14, and is likely to downwardly flex due to the weight of the hand. When the palm rest portion 24 downwardly flexes, it presses the elastic members 38 and 40 encompassing the speakers 34 and 36, so that the speakers 34 and 36 reach the condition where they are tightly fixed to the case 18, reducing thereby the gap between the palm rest 24 and the speakers 34 and 36. In consequence, the palm rest portion 24 serves as a separating plate that separates the front portion of the speakers 34 and 36 from their rear portion and improves directivity and output of the speakers 34 and 36. It is thus possible to reduce the thickness and the size of the keyboard 18 and the speakers 34 and 36 and, eventually, to reduce the thickness and the size of the information processing apparatus.

The present invention is explained above by way of example of the portable information processing apparatus, but can be similarly applied to a keyboard as a single body (such as a separate keyboard connected to a desk-top personal computer) without departing from the scope of the present invention. To further explain this, with reference to FIG. 1, for example, the application of the present invention pertains to only a portion of the keyboard portion 14 in FIG. 1, and the processor, etc, is not necessary in the apparatus body 12, and only the minimum construction for the key input (keys 20), the palm rest portion 24 and the speakers are necessary. The display 16 is not necessary, either. In such an embodiment too, the present invention can acquire the effects described above too.

As described above, the present invention makes it possible to install the speaker at a position in the case of the apparatus at which it is likely to flex, and to improve the speaker output. The present invention can also reduce the thickness and the size of the keyboard having the speaker built therein and eventually, the thickness and the size of the information processing apparatus using the keyboard such as the notebook type personal computer and the personal computer, and can keep tone quality and output of the speaker at a higher level.

What is claimed is:

1. A keyboard comprising:
    a plurality of keys;
    a case including a palm rest portion; and
    a speaker encompassed by an elastic member and held by said elastic member in a region below said palm rest portion of said case,
    wherein said elastic member has an annular portion encompassing an outer peripheral portion of said speaker, a bottom portion at least partially covering a bottom portion of said speaker, and an upper portion at least partially covering a peripheral portion of an upper portion of said speaker.

2. A keyboard according to claim 1, wherein the bottom portion of said elastic member has an engagement portion to be anchored to said keyboard.

3. A keyboard according to claim 2, which comprises a groove for receiving said engagement portion.

4. A keyboard according to claim 1, wherein said elastic member is made of a rubber.

5. A keyboard according to claim 1, wherein said keyboard comprises a lower cover, an electric member mounted to said lower cover, and an upper cover at least partially covering said lower cover; and wherein said speaker is mounted to said lower cover in such a fashion as to emit sound towards said upper cover, and said upper cover has holes above said speaker for emitting sound.

6. A keyboard according to claim 5, wherein at least said palm rest portion of said upper cover is made of a flexible material so that said palm rest portion flexes due to a weight of a user's hand when the user places the palm on said palm rest portion, thereby reducing a gap between said palm rest portion and said speaker to improve directivity of said speaker.

7. An electronic apparatus comprising:
    a case including a palm rest portion; and
    a speaker encompassed by an elastic member and held by said elastic member in a region of said case below said palm rest portion,
    wherein said elastic member has an annular portion encompassing an outer peripheral portion of said speaker, a bottom portion at least partially covering a bottom portion of said speaker, and an upper portion at least partially covering a peripheral portion of an upper portion of said speaker.

8. An electronic apparatus according to claim 7, wherein the electronic apparatus further includes a keyboard portion, and said palm rest portion is disposed in the proximity of said keyboard portion.

9. An electronic apparatus according to claim 7, wherein said electronic apparatus has a body including said keyboard portion and said palm rest portion.

10. An electronic apparatus according to claim 9, which has a display portion, wherein said display portion is coupled by a hinge portion of said body in such a fashion as to be capable of opening and closing.

11. An electronic apparatus according to claim 7, wherein said elastic member has an annular portion encompassing an outer peripheral portion of said speaker, a bottom portion at least partially covering a bottom portion of said speaker, and an upper portion at least partially covering a peripheral portion of an upper portion of said speaker.

12. An electronic apparatus according to claim 11, wherein said bottom portion of said elastic member has an engagement portion to be anchored to a keyboard.

13. An electronic apparatus according to claim 12, wherein said keyboard has a groove for receiving said engagement portion.

14. An electronic apparatus according to claim 11, wherein said elastic member is made of a rubber.

15. An electronic apparatus according to claim 7, wherein said electric apparatus comprises a lower cover, an electric member mounted to said lower cover, and an upper cover at least partially covering said lower cover; and wherein said speaker is mounted to said lower cover in such a fashion as to emit sound towards said upper cover, and said upper cover has holes above said speaker for emitting sound.

16. An electronic apparatus according to claim 15, wherein at least said palm rest portion of said upper cover is made of a flexible material, and said palm rest portion of said upper cover deflects due to a weight of a user's hand when the user puts the palm on said palm rest portion, thereby reducing a gap between said palm rest portion and said speaker to improve directivity of said speaker.

17. An electronic apparatus according to claim 7, wherein said electronic apparatus is of a portable type.

18. An electronic apparatus according to claim 7, wherein said electronic apparatus comprises an information processing apparatus.

* * * * *